US012593224B2

(12) United States Patent
Akdim et al.

(10) Patent No.: US 12,593,224 B2
(45) Date of Patent: Mar. 31, 2026

(54) CROWDSOURCED DATA ASSISTED PERSONALIZED NETWORK SLICING

(71) Applicant: Apple Inc., Cupertino, CA (US)

(72) Inventors: Nabil Akdim, Munich (DE); Gencer Cili, San Jose, CA (US); Ajoy K Singh, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 18/477,779

(22) Filed: Sep. 29, 2023

(65) Prior Publication Data

US 2025/0113279 A1      Apr. 3, 2025

(51) Int. Cl.
| | |
|---|---|
| *H04W 24/02* | (2009.01) |
| *H04W 24/10* | (2009.01) |
| *H04W 28/08* | (2023.01) |
| *H04W 28/10* | (2009.01) |
| *H04W 36/00* | (2009.01) |
| *H04W 36/30* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ........... *H04W 24/02* (2013.01); *H04W 24/10* (2013.01); *H04W 28/0967* (2020.05); *H04W 28/10* (2013.01); *H04W 36/13* (2023.05); *H04W 36/304* (2023.05); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04B 17/0082–409; H04L 41/02–5096; H04L 43/02–55; H04W 8/18–245; H04W 24/02–10; H04W 28/02–26; H04W 36/0005–385; H04W 60/005–06; H04W 72/02–569; H04W 76/10–50; H04W 84/005–22; H04W 88/005–188; H04W 92/02–24
See application file for complete search history.

(56) References Cited

U.S. PATENT DOCUMENTS

| | | |
|---|---|---|
| 11,323,935 B2 | 5/2022 | Soma |
| 2022/0167355 A1 | 5/2022 | Andrews |
| 2023/0092595 A1 | 3/2023 | Wong |

*Primary Examiner* — Timothy J Weidner
(74) *Attorney, Agent, or Firm* — Kowert, Hood, Munyon, Rankin & Goetzel, P.C.

(57) ABSTRACT

Apparatuses, systems, and methods for crowdsourced data assisted personalized network slicing, e.g., in 5G NR systems and beyond. A UE may receive crowdsourced data associated with network slice configurations and determine, based, at least in part, on the crowdsourced data, radio channel metrics that will indicate degradation of key performance indicators (KPIs) for a network slice. The UE may monitor the radio channel metrics and request, based on the monitoring, to change to one of a different radio access network (RAN) configuration (that is better for its currently used network slice) or to a different network slice all together.

20 Claims, 8 Drawing Sheets

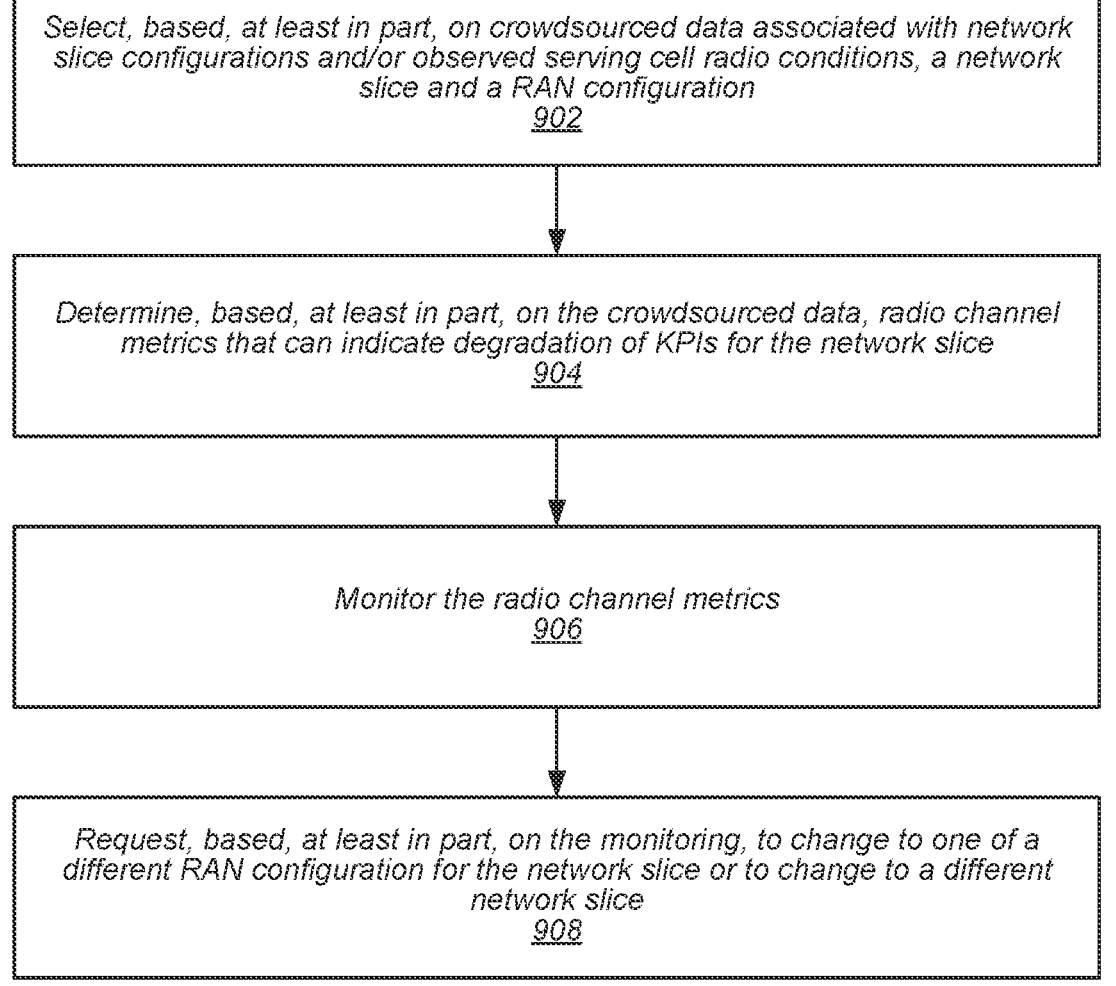

Select, based, at least in part, on crowdsourced data associated with network slice configurations and/or observed serving cell radio conditions, a network slice and a RAN configuration
902

Determine, based, at least in part, on the crowdsourced data, radio channel metrics that can indicate degradation of KPIs for the network slice
904

Monitor the radio channel metrics
906

Request, based, at least in part, on the monitoring, to change to one of a different RAN configuration for the network slice or to change to a different network slice
908

FIG. 9

CROWDSOURCED DATA ASSISTED PERSONALIZED NETWORK SLICING

FIELD

The invention relates to wireless communications, and more particularly to apparatuses, systems, and methods for crowdsourced data assisted personalized network slicing, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for crowdsourced data assisted personalized network slicing, e.g., in 5G NR systems and beyond. A user equipment device (UE) may use crowdsourced data to determine what particular radio channel metrics will likely result in degraded key performance indicators (KPIs) for a particular network slice, and based on the determination, proactively request (and/or command) a network to change to a different RAN configuration or slice. In other words, a UE may use crowdsourced data to aid in requesting a "best network slice" given the UE's current environment (e.g., location, running apps, network condition, and so forth). The UE may combine the crowdsourced data with the UE's current environment observations to request and/or force/command the network to configure a configuration that provides the "best" per network slice quality of service.

For example, in some embodiments, a UE may be configured to select, based, at least in part, on crowdsourced data associated with network slice configurations and/or observed serving cell radio conditions, a network slice and a radio access network (RAN) configuration. In some instances, the UE may be configured to receive the crowdsourced data associated with network slice configurations from a server associated with the UE. The UE may be configured to determine, based, at least in part, on the crowdsourced data, radio channel metrics that (will and/or can) indicate degradation of KPIs for the network slice. The UE may be configured to monitor the radio channel metrics and request (e.g., via negotiation and/or explicit command), based, at least in part, on the monitoring, to change to one of a different RAN configuration for the network slice or to change to a different network slice.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 9 illustrates a block diagram of an example of a method for network slice configuration requesting and/or selection, according to some embodiments.

Figure 1:
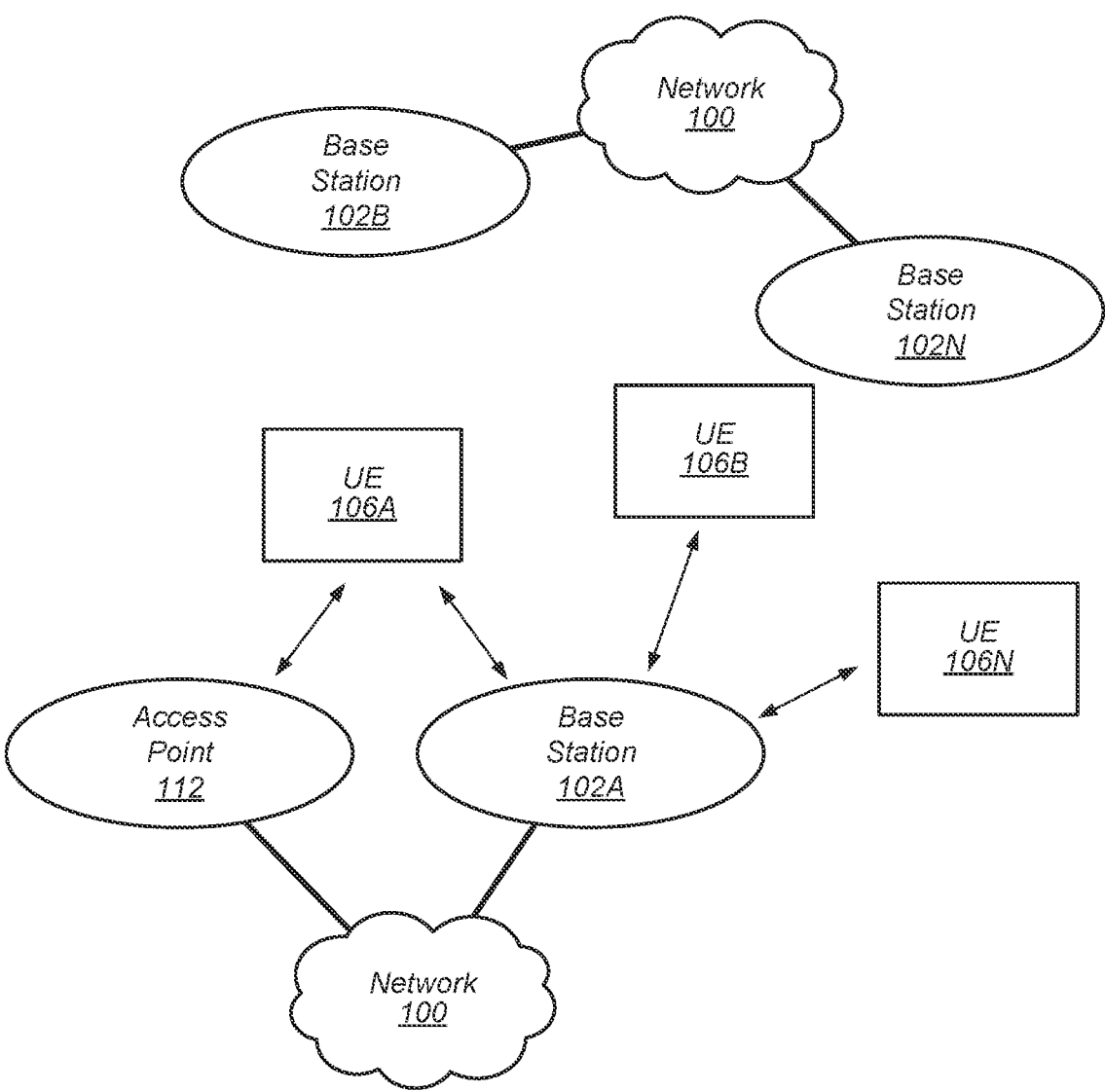
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
PDCCH: Physical Downlink Control Channel
PDSCH: Physical Downlink Shared Channel
RRC: Radio Resource Control

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1: Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as LTE, LTE-Advanced (LTE-A), 5G new radio (5G NR), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network

100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

In addition, the UE 106 may be in communication with an access point 112, e.g., using a wireless networking (e.g., Wi-Fi) and/or peer-to-peer wireless communication protocol (e.g., Bluetooth, Wi-Fi peer-to-peer, etc.). The access point 112 may provide a connection to the network 100.

Figure 2:
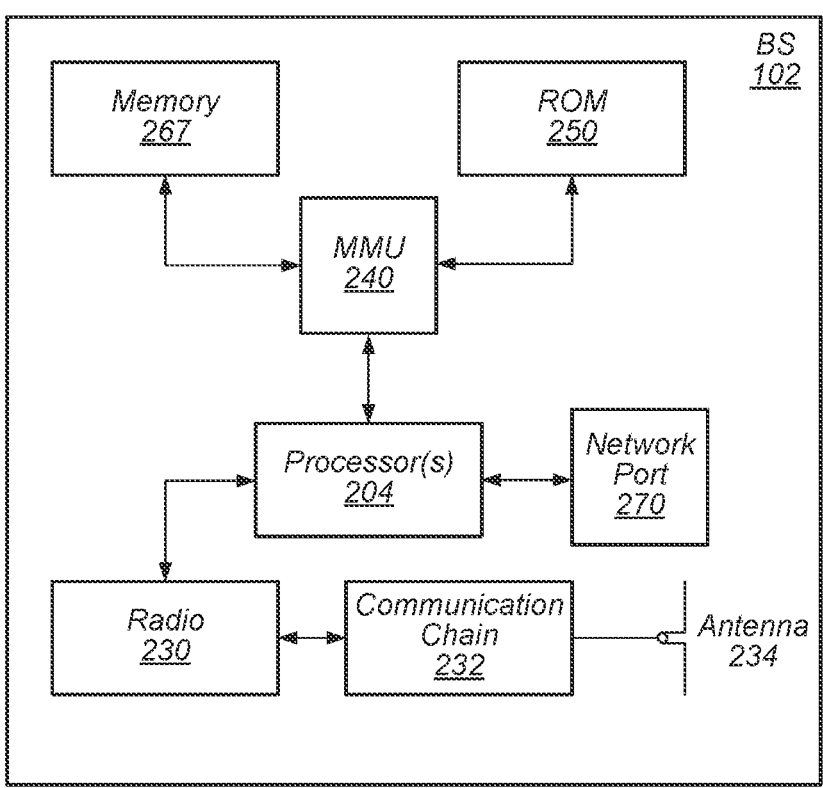
FIG. 2 illustrates an example block diagram of a base station, according to some embodiments.
Figure 3:
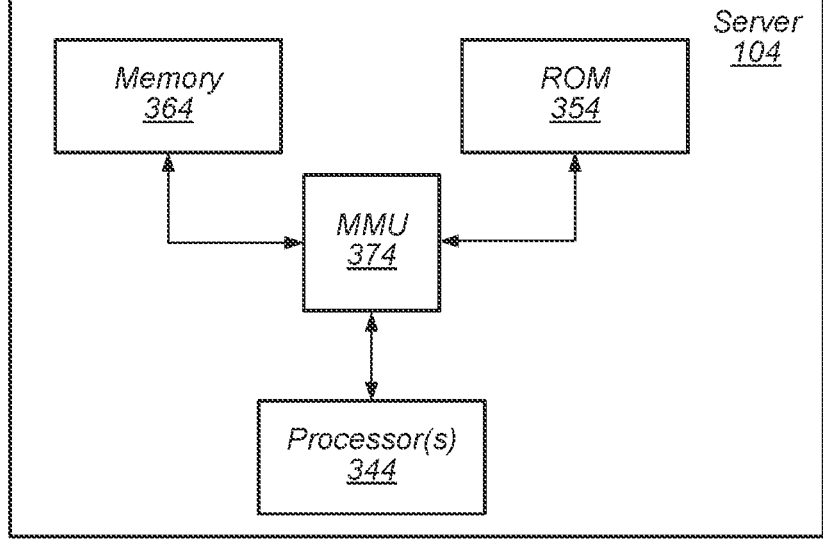
FIG. 3 illustrates an example block diagram of a server, according to some embodiments.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., LTE, LTE-A, 5G NR, and beyond). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.
FIG. 2: Block Diagram of a Base Station FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
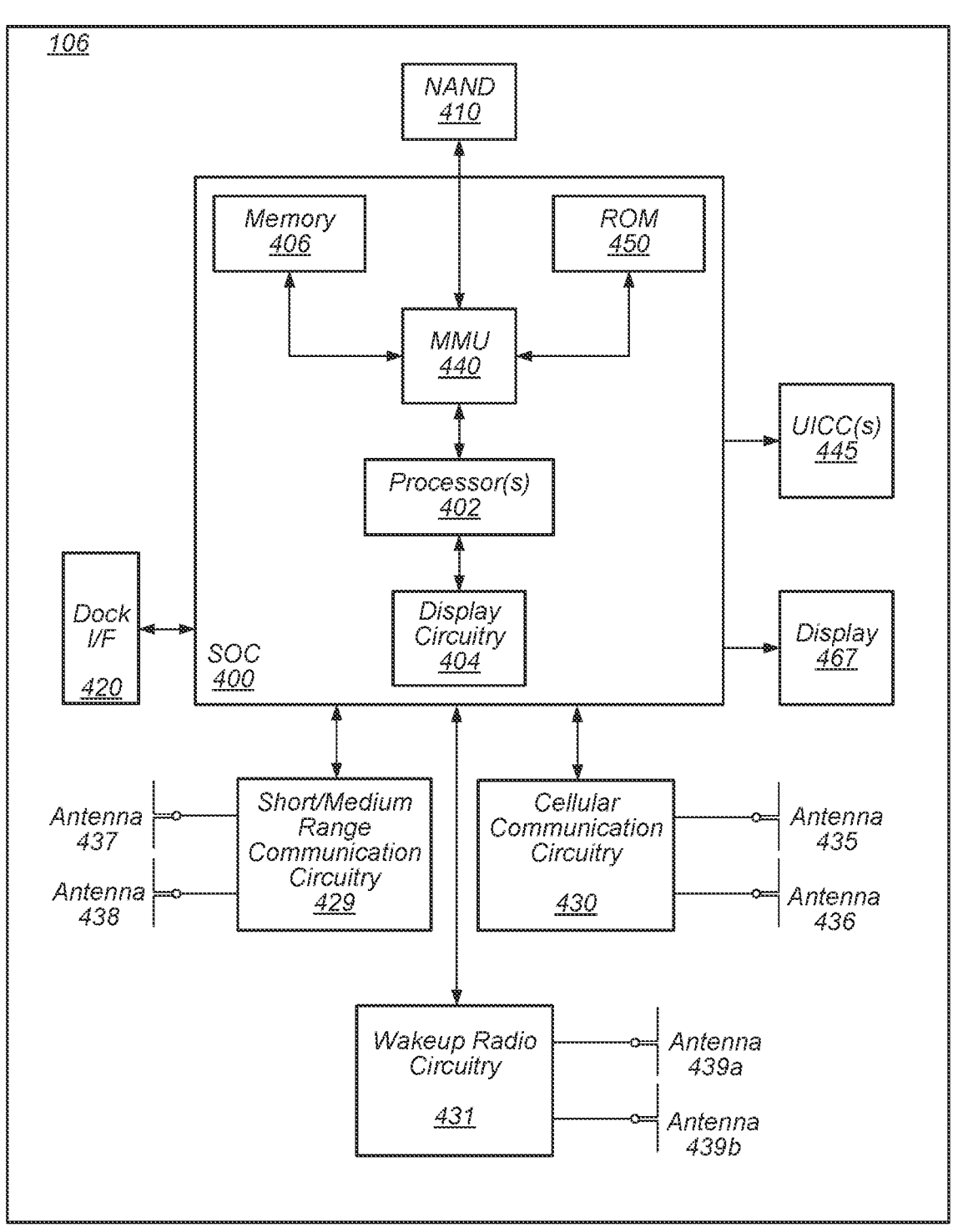
FIG. 4 illustrates an example block diagram of a UE, according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, LTE-A, etc., short to medium range wireless communication circuitry 429 (e.g., Bluetooth™ and WLAN circuitry), and wakeup radio circuitry 431. In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The wakeup radio circuitry 431 may also couple (e.g., communicatively; directly or indirectly) to one or more antennas, such as antennas 439a and 439b as shown. Alternatively, the wakeup radio circuitry 431 may couple (e.g., communicatively; directly or indirectly) to the antennas 435 and 436 in addition to, or instead of, coupling (e.g., communicatively; directly or indirectly) to the antennas 439a and 439b. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration. The wakeup radio circuitry 431 may include a wakeup receiver, e.g., wakeup radio circuitry 431 may be a wakeup receiver. In some instances, wakeup radio circuitry 431 may be a low power and/or ultra-low power wakeup receiver. In some instances, wakeup radio circuitry may only be powered/active when cellular communication circuitry 430 and/or the short to medium range wireless communication circuitry 429 are in a sleep/no power/inactive state. In some instances, wakeup radio circuitry 431 may monitor (e.g., periodically) a specific frequency/channel for a wakeup signal. Receipt of the wakeup signal may trigger the wakeup radio circuitry 431 to notify (e.g., directly and/or indirectly) cellular communication circuitry 430 to enter a powered/active state.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards").

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for methods for crowdsourced data assisted personalized network slicing, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
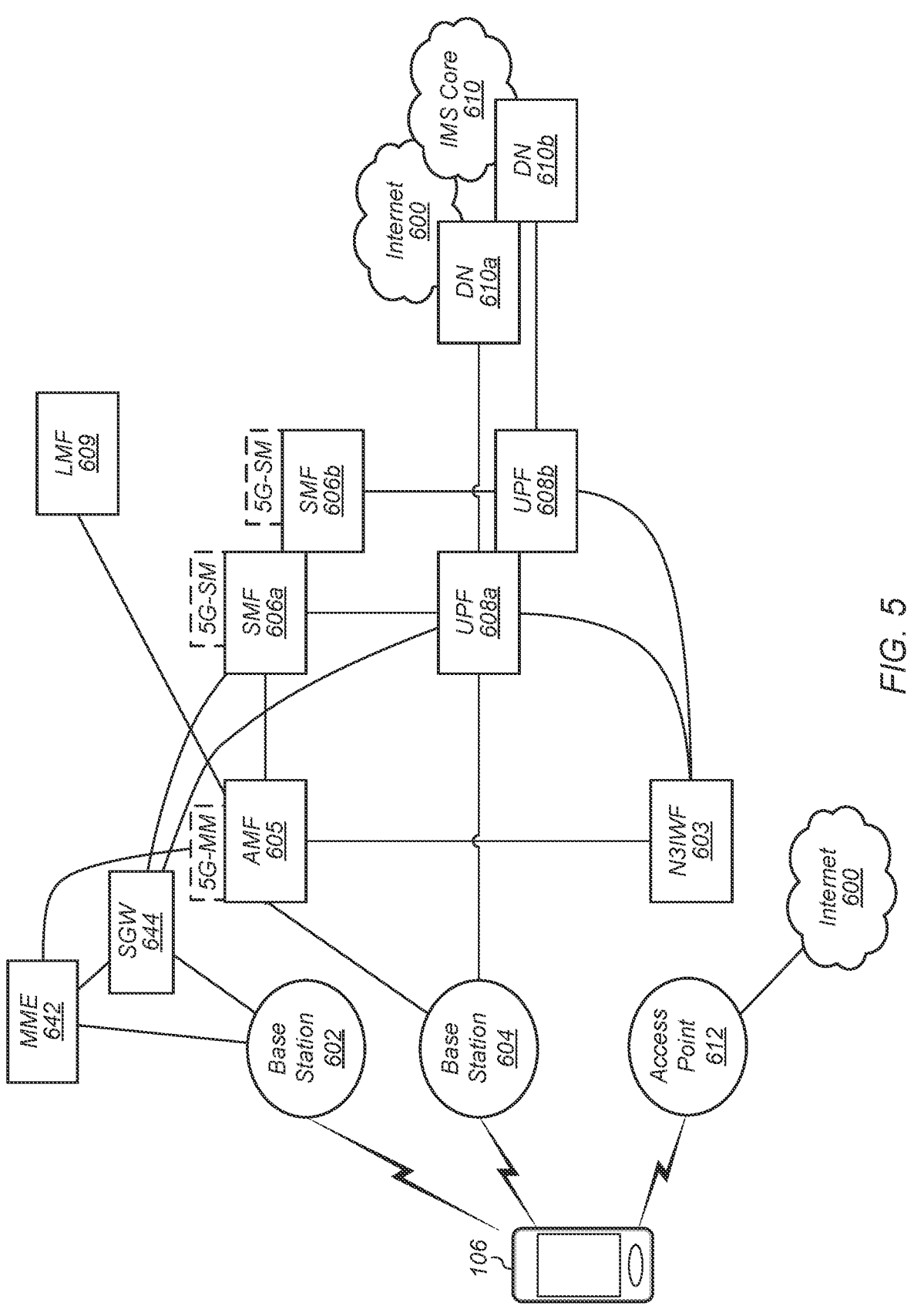
FIG. 5 illustrates an example of a 5G network architecture that incorporates both dual 3GPP (e.g., LTE and 5G NR) access and non-3GPP access to the 5G CN, according to some embodiments.

FIG. 5: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 5 illustrates an example of a 5G network architecture that incorporates both dual 3GPP (e.g., cellular access via LTE and 5G-NR) and non-3GPP (e.g., non-cellular) access to the 5G CN, according to some embodiments. As shown, a user equipment device (e.g., such as UE 106) may access the 5G CN through both a radio access network (RAN, e.g., such as gNB 604 or eNB 602, each of which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may be in communication with a location management function (LMF) 609 via a networking interface, such as an NLs interface. The LMF 609 may receive measurements and assistance information from the RAN (e.g., gNB 604) and the UE (e.g., UE 106) via the AMF 605. The LMF 609 may be a server (e.g., server 104) and/or a functional entity executing on a server. Further, based on the measurements and/or assistance information received from the RAN and the UE, the LMF may determine a location of the UE. In addition, the AMF 605 may include functional entities associated with the 5G CN (e.g., such as a network slice selection function (NSSF), a short message service function 622, an application function (AF), unified data management (UDM), a policy control function (PCF), and/or an authentication server function. Note that these functional entities may also be supported by a session management function (SMF) 606*a* and an SMF 606*b* of the 5G CN. The AMF 605 may be connected to (or in communication with) the SMF 606*a*. Further, the gNB 604 may in communication with (or connected to) a user plane function (UPF) 608*a* that may also be communication with the SMF 606*a*. Similarly, the N3IWF 603 may be communicating with a UPF 608*b* that may also be communicating with the SMF 606*b*. Both UPFs may be communicating with the data network (e.g., DN 610*a* and 610*b*) and/or the Internet 600 and Internet Protocol (IP) Multimedia Subsystem/IP Multimedia Core Network Subsystem (IMS) core network 610.

Note that in various embodiments, one or more of the above-described entities may be configured to perform methods for crowdsourced data assisted personalized network slicing, e.g., in 5G NR systems and beyond, e.g., as further described herein.

Crowdsourced Data Assisted Personalized Network Slicing

In current implementations, when a network supports network slicing and indicates that network slicing is to be used, a UE may select or be assigned a network slice from a network slice pool that the network supports. The selection/assignment is based solely on UE Route Selection Policy (URSP) rules. However, URSP rules are built/defined mainly upon transport/core network capabilities and typically do not take into account the network's radio access network (RAN) wireless channel's signal level and/or congestion level dynamics, both of which affect the UE's assigned network slice key performance indicators (KPIs) (e.g., throughput, latency, and so forth). Note that the KPIs in turn affect the UE's running application performance when using the network (e.g., when using cellular communications over the network).

Thus, in current implementations, the UE is configured with RAN wireless resources (e.g., resource blocks (RBs), MAC layer configurations, and/or physical (PHY) layer configurations) assigned by a network for a network slice served by a protocol data unit (PDU) session when the PDU session is being established. The UE has no input on which parameters and/or configuration are applied/used on the RAN side even though the UE is aware of its own cellular radio conditions (and of the impact such changing conditions may have on device application context/performance). Further, when the network slice's currently assigned RAN resources do not uphold a promised network slice's Quality of Service (QoS), the network tends to apply non-network slicing techniques, such as hybrid automatic repeat request (HARQ)/automatic repeat request (ARQ) retransmissions, increasing transmit power, and so forth, in an attempt to improve the network slice's QoS.

However, the current implement has some drawbacks as it is semi-static in nature, does not consider UE radio conditions and does not adapt well to changing wireless conditions in cellular networks. Therefore, improvements are desired.

Embodiments described herein provide systems, methods, and mechanisms for crowdsourced data assisted personalized network slicing, including systems, methods, mechanisms for a UE to use crowdsourced data to determine what particular radio channel metrics will likely result in degraded key performance indicators (KPIs) for a particular network slice, and based on the determination, proactively request a network to change to a different RAN configuration or slice. In other words, a UE may use crowdsourced data to aid in requesting a "best network slice" given the UE's current environment (e.g., location, running apps, network condition, and so forth). The crowdsourced data may include configurations providing "best" per network slice quality of service. The UE may combine the crowdsourced data with the UE's current environment observations to request and/or force/command the network to configure a configuration that provides the "best" per network slice quality of service. The UE may make the request either pro-actively or re-actively. Additionally, the UE may use crowdsourced data to determine whether or not to disable network slicing.

For example, in some instances, crowd-source data "best" per network slice RAN configurations may be collected from a plurality of UEs, e.g., without inclusion of user identifiable data. The data collected may be per receive signal level, may include interference and UE side measured network congestion level ranges. In addition, the data may be per specific scenarios (e.g., such as used applications, location, operator, and so forth without including data that is usable to identify a user and/or a device). The data may then be combined, e.g., at a server, and a subset of the data may be pushed (e.g., automatically/autonomously sent) to a UE. The subset of data may include highest rated/ranked (e.g., "best") configurations providing optimal (e.g., "best" and/or highest rated/ranked) per network slice QoS. Note that optimal/highest ranked/highest rated/best may be based on UE per network slice measured QoS, e.g., such as user plane latency for Ultra-Reliable Low Latency Communications (URRLC) use cases, achieved throughput for Enhanced Mobile Broadband (eMBB) use cases, and/or network accessibility/retainability for Massive Machine-Type Communications (MTC) use cases.

Further, in some instances, to improve perceived user experience, a UE may combine the received crowdsourced data with instantaneous information (e.g., such as running apps, measured channel conditions, and so forth) and use UE Assistance Information (UAI) and/or another technique (e.g., other messaging) to request and/or force the network to configure the UE with the best configuration, e.g., based on the received crowdsourced data. In some instances, the UE may re-trigger the above-described mechanism and/or may the UE may decide or determine to switch to a better slice (e.g., better in the sense as described above), e.g., by leveraging aggregated crowdsourced data along with online measured cellular radio and congestion levels, to proactively decide or determine to switch to using a better RAN configuration and/or network slice (note that proactivity here is in the sense of deciding and/or determining to start using a better RAN configuration and/or network slice before (e.g., prior to) actual QoS degradation), by leveraging aggregated crowdsourced data to choose and/or select a network slice to fall back to, and/or by leveraging aggregated crowdsourced data to disable network if and/or when radio conditions are semi-static to static (e.g., not changing much) but current network slice's main KPI is degrading.

In some instances, parameters of interest, e.g., per radio condition and application context aware parameters, may include any, any combination of, and/or all of URSP Rule and Traffic Descriptor, control plane (CP) configurations such as Packet Data Convergence Protocol (PDCP) header compression and reordering timers, Radio Link Control (RLC) mode, Buffer Status Report (BSR) configuration, and/or persistent scheduling setup, discontinuous reception cycle (DRX) preference, minimum scheduling to hybrid automatic repeat request (HARQ) feedback offset, preferred Radio Resource Control (RRC) state, maximum bandwidth, and/or component carrier (CC)/multiple-input-multiple-output (MIMO) orders preference. Note that the parameters of interest do not include any identifying information associated with a device, e.g., UE, and/or a user of the device. In some instances, the parameters of interest may be locally collected, e.g., at the UE, and/or crowdsourced. In some instances, the parameters of interest may be collected when network slicing is active (e.g., on) as well as when network slicing is inactive (e.g., inactive and/or deactivated).

In some instances, the parameters of interest may influence/affect particular network slice KPIs. For example, URSP Rule and Traffic Descriptor may affect a network slice type and related main KPI type (e.g., such as high throughput and/or low latency). As another example, CP configurations, DRX preference, and/or minimum scheduling to HARQ feedback offset may affect latency and/or inter-packet delay. Further, a preferred RRC state may affect use of inactive state for bursty low throughput traffic. Additionally, maximum bandwidth and/or CC/MIMO order preference may affect throughput.

In some instances, collected configuration combinations (e.g., measured KPI and/or measured radio conditions) may be grouped to generate and/or form network slice configurations. For example, a URSP configuration 1 may include a slice identifier (ID) and value of a main KPI for a network slice that is measured and/or reported to have a good reference signal received power (RSRP), a good signal to interference plus noise ratio (SINR), and no congestion. Note that RSRP and/or SINR may be categorized based on ranges, where an RSRP/SINR in a highest performing range is categorized as good, an RSRP/SINR is a second highest performing range is categorized as moderate, and so forth such that an RSRP/SINR is a lowest performing range is categorized as bad. Similarly, for congestion, a network slice may be categorized as either congested (e.g., traffic exceeds a threshold) or not congested (e.g., traffic is below a threshold). Note that congestion could also be categorized based on ranges of traffic, e.g., similarly to RSRP/SINR. As another example, a URSP configuration 2 may include a slice ID and a value of a main KPI as well as categorizations/quantifications for RSRP, SINR, and congestion. A similar process may also be performed for control plane configurations, DRX configurations, scheduling configurations, preferred RRC state, and/or throughput configurations.

Figure 6:
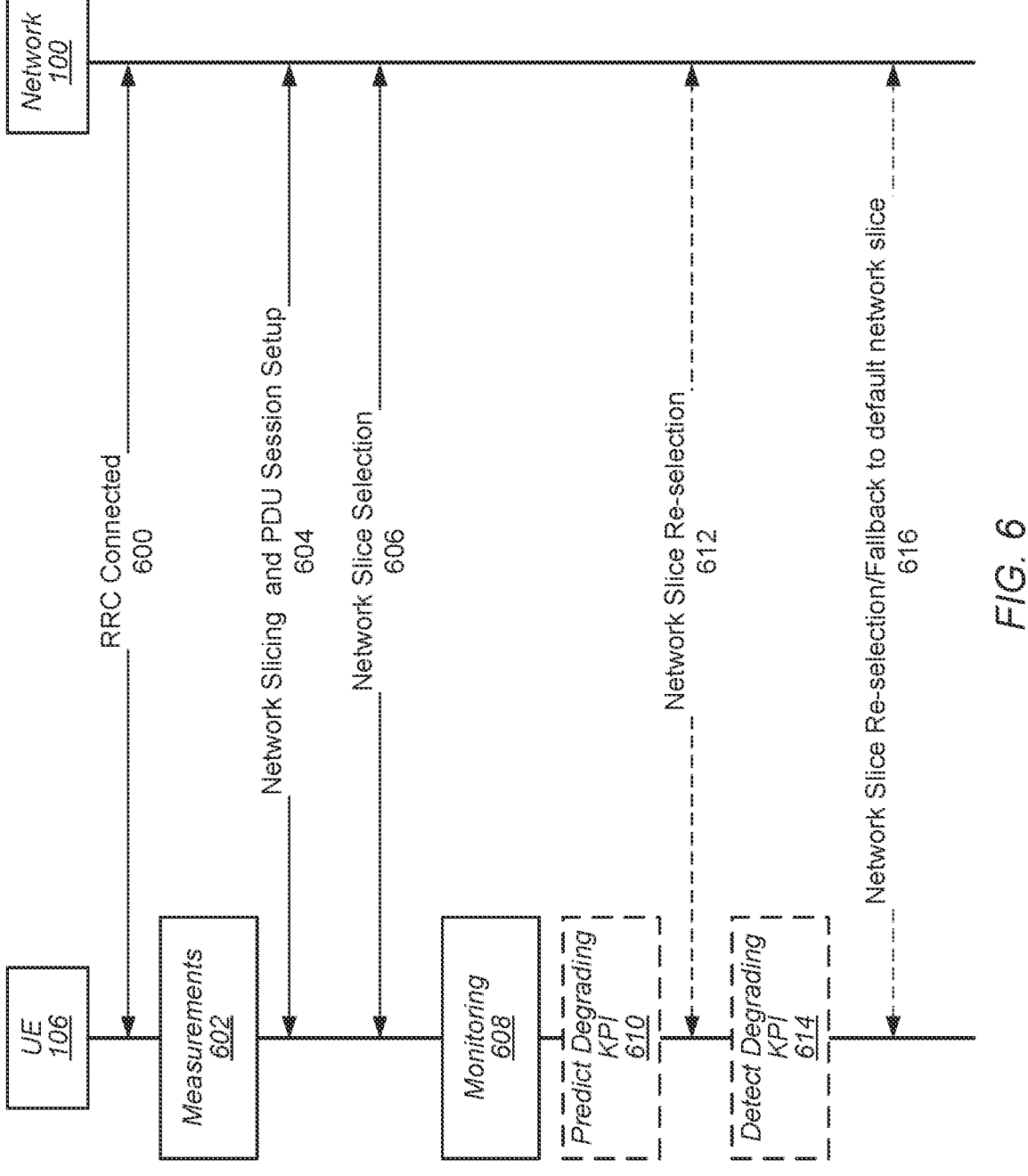
FIG. 6 illustrates an example of signaling for UE network slice configuration selection, according to some embodiments.

FIG. 6 illustrates an example of signaling for UE network slice configuration selection, according to some embodiments. The signaling shown in FIG. 6 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 600, a UE, such as UE 106, may be in a radio resource control (RRC) connected state with a network, such as network 100. For example, the UE may have established an RRC connection with a serving cell, such as a cell supported and/or operated by a base station, such as base station 102. In other words, the UE may have an established RRC connection with a base station.

At 602, the UE may measure serving cell radio signal and congestion levels. For example, the UE may perform reference signal received power (RSRP) measurements and/or signal to interference plus noise ratio (SINR) measurements. As another example, the UE may measure, sense, and/or estimate radio congestion levels on the cell.

At 604, the UE may select, choose, and/or determine, e.g., based on aggregated crowdsourced network slice configuration data received from a database associated with the UE and/or on device stored URSP rule list, a network slice ID/URSP rule that matches a running application's main KPI under current measured serving cell conditions. The UE may indicate the selected, chosen, and/or determined network slice ID (e.g., the UE's preferred network slice ID) as a first preference in a support slice ID list included in PDU session setup.

At 606, the UE may select, choose, and/or determine, e.g., based on aggregated crowdsourced network slice configuration data received from a database associated with the UE and/or on device stored radio access network (RAN) configuration list, a RAN configuration that may maximize the main KPI of the selected, chosen, and/or determined network slice ID. The UE may use a UE assistance information (UAI) procedure and/or any other procedure that allows the UE to coordinate a change in RAN configuration with the network to negotiate with and/or force (e.g., command) the network to use the selected, chosen, and/or determined RAN configuration.

At 608, the UE may monitor the running application's main KPI values and/or serving cell conditions, e.g., such as serving cell radio signal quality (e.g., RSRP and/or SINR) and congestion conditions.

At 610, in some instances (e.g., optionally), the UE may, based, at least in part, on the monitoring, predict and/or determine that the (running application's) main KPI values are degrading and/or will be degrading. The prediction and/or determination may be based, at least in part, on changing serving cell conditions (e.g., such as a decrease in RSRP, an increase in SINR, and/or increasing congestion). In some instances, the prediction and/or determination may be rated by the UE based, at least in part, on a confidence value (e.g., the prediction and/or determination that the main KPI values are degrading and/or will be degrading may require a specified confidence value, thus, if the prediction and/or determination does not exceed the specified confidence value, the UE may not determine and/or predict that the main KPI values are degrading and/or will be degrading). Further, the prediction and/or determination may be based, at least in part, on the aggregated crowdsourced network slice configuration data received from the database associated with the UE.

At 612, based on the determination that the main KPI values are degrading and/or the prediction that the main KPI values will degrade, the UE may select a new RAN configuration different from the RAN configuration selected at 606. The new RAN configuration may be selected and/or chosen to maximize the main KPI values for the network slice based on the monitored serving cell conditions. In some instances, the UE may trigger the selection of the new RAN configuration via a PDU session update procedure. For example, the UE may use a UAI procedure and/or any other procedure that allows the UE to coordinate a change in RAN configuration with the network. Note that in at least some instances, to reduce perceived user quality of experience degradation impact, the UE may leverage a network slice quality of service to cell quality of service relationship to proactively predict when to select a new (and better) RAN configuration.

At 614, in some instances (e.g., optionally), the UE may detect and/or determine that the main KPI values are degrading and/or have degraded. In addition, the UE may detect and/or determine that cell conditions have not (substantially) changed and/or are not (substantially) changing, e.g., the cell conditions are remaining with an acceptable range.

At 616, based on the determination that the main KPI values are degrading and/or have degraded and/or based on the determination that the main KPI values are not (substantially) improving after changing the RAN configuration at 612, the UE may attempt to switch to a new network slice, e.g., when there is another network slice ID that matches the running application main KPI values and can likely improve the main KPI values for the current serving cell conditions. In some instances, the UE may trigger the selection of the new network slice via a PDU session update procedure. In some instances, the UE may (additionally) use a UAI procedure and/or any other procedure that allows the UE to coordinate a change only in the network slice's RAN configuration with the network, without updating the entire PDU session. Note that in at least some instances, when there is no other network slice ID that matches the running application main KPI values and can likely improve the main KPI values for the current serving cell conditions, the UE may fallback to a default network slice, e.g., the UE may discontinue use of network slicing on the serving cell based on the current serving cell conditions.

Figure 7:
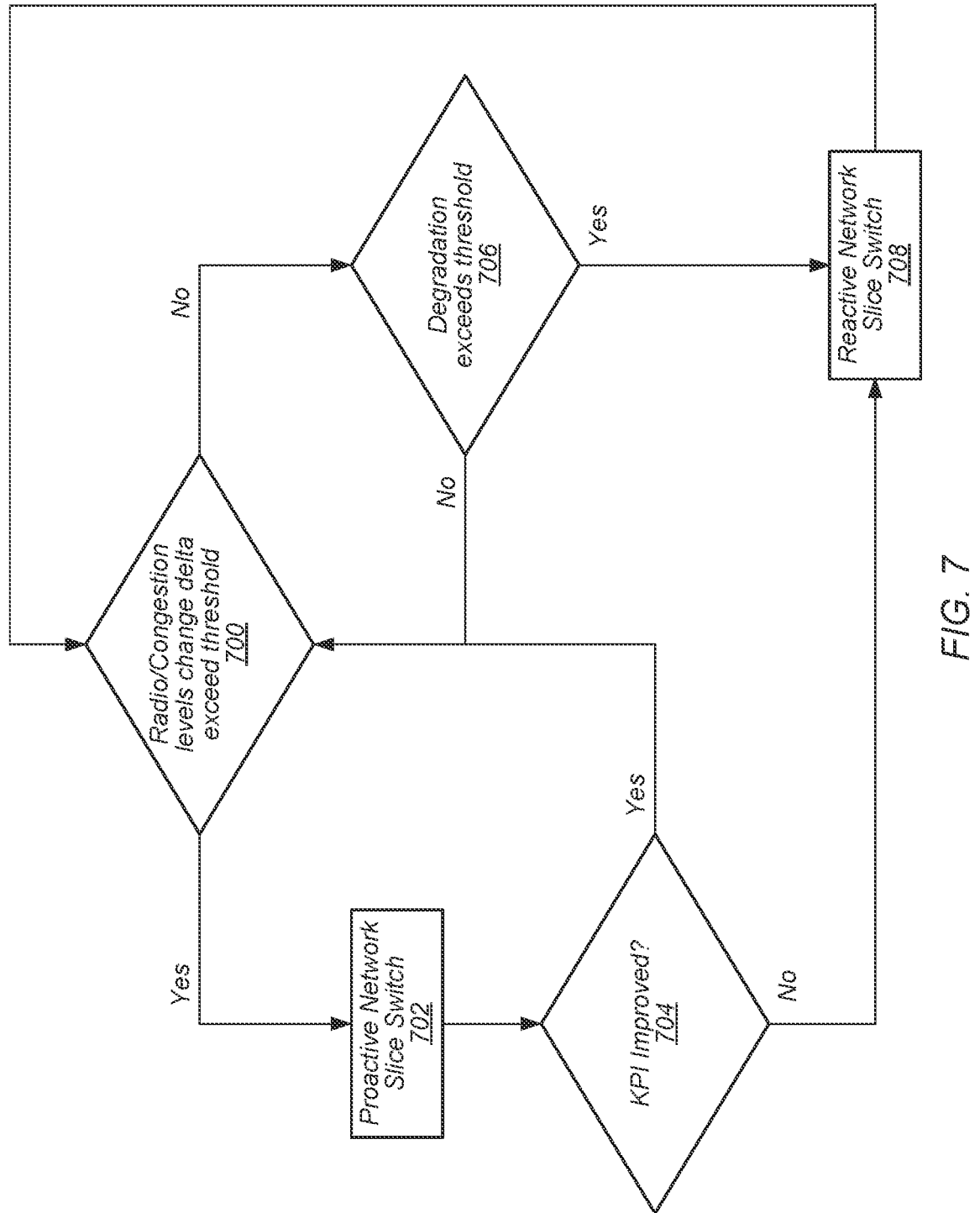
FIG. 7 illustrates a block diagram of an example of a state machine for UE network slice configuration selection, according to some embodiments.

FIG. 7 illustrates a block diagram of an example of a state machine for UE network slice configuration selection, according to some embodiments. The state machine shown in FIG. 7 may be used in conjunction with any of the systems, methods, or devices shown in the Figures, among other devices. In various embodiments, some of the state machine elements shown may be performed concurrently, in a different order than shown, or may be omitted. Additional state machine elements may also be performed as desired. Note that this state machine may correspond to UE actions as described above at 610, 612, 614, and/or 616. As shown, this state machine may operate as follows.

At 700, a UE, such as UE 106, may determine whether serving cell radio conditions (e.g., such as RSRP and/or SINR) and/or serving cell radio congestion levels are changing at a rate that exceeds a threshold. The threshold may include a hysteresis level to avoid unnecessary triggering. For example, the UE may be connected to a serving cell that supports multiple network slices. The network slices may be of the same or different type. Thus, the UE may monitor multiple measures of serving cell performance, e.g., RSRP, SINR, congestion, and so forth. Further, the UE may compare a rate of change of the serving cell performance to one or more thresholds to determine whether serving cell performance is degrading and/or may degrade. As an example, the UE may monitor congestion in the serving cell and when a rate of congestion increases beyond a threshold value for a period of time (e.g., a hysteresis "buffer"), the UE may determine that serving cell congestion levels are changing at a rate that exceeds the threshold. As another example, the UE may monitor RSRP for the serving cell and when a rate of RSRP degradation increase beyond a threshold value for a period of time (e.g., a hysteresis "buffer"), the UE may determine that serving cell RSRP is changing at a rate that exceeds the threshold. As a further example, the UE may monitor SINR for the serving cell and when a rate of SINR degradation increase beyond a threshold value for a period of time (e.g., a hysteresis "buffer"), the UE may determine that serving cell SINR is changing at a rate that exceeds the threshold. Note that when the UE determines that the serving cell radio conditions (e.g., such as RSRP and/or SINR) and/or the serving cell radio congestion levels are changing at a rate that exceeds the threshold, the state machine may move to 702. Note further that when the UE does not determine that the serving cell radio conditions (e.g., such as RSRP and/or SINR) and/or the serving cell radio congestion levels are changing at a rate that exceeds the threshold, the state machine may move to 706.

At 702, in response to determining that the serving cell radio conditions (e.g., such as RSRP and/or SINR) and/or the serving cell radio congestion levels are changing at a rate that exceeds the threshold, the UE may perform a proactive network slice switch and/or RAN configuration change. In such instances, based on the determination at 700, the UE may conclude that KPI for the network slice will degrade with a high level of confidence (e.g., based on aggregated crowdsourced data received from a server associated with the UE) and select a new (e.g., different) RAN configuration that may maximize the KPI in current service cell radio conditions. In some instances, the UE may trigger the selection of the new RAN configuration via a PDU session update procedure. The UE may (additionally) use a UAI procedure and/or any other procedure that allows the UE to coordinate a change only in RAN configuration with the network, e.g., without updating the entire PDU session. Note that in at least some instances, to reduce perceived user quality of experience degradation impact, the UE may leverage a network slice quality of service to cell quality of service relationship to proactively predict when to select a new RAN configuration.

At 704, after switching to the new RAN configuration, the UE may monitor KPI, e.g., to determine whether or not switching to the new RAN improved KPI. Note that when the UE determines that switching to the new RAN improved KPI, the state machine may return to 700. Note further that when the UE determines that switching to the new RAN did not improve KPI, the state machine may move to 708.

At 706, in response to not determining that the serving cell radio conditions (e.g., such as RSRP and/or SINR) and/or the serving cell radio congestion levels are changing at a rate that exceeds the threshold, the UE may monitor KPI. For example, the UE may compare a rate of change of KPI to a threshold. Further, when KPI is decreasing (e.g., degrading) and the rate of change of KPI exceeds the threshold, the state machine may move to 708. Alternatively, when KPI is not decreasing and/or when the KPI is decreasing but the rate of change of KPI does not exceed the threshold, the state machine may return to 700.

At 708, in response to determining that KPI did not improve after switching to the new RAN configuration and/or in response to determining that the KPI is decreasing (e.g., degrading) and the rate of change of KPI exceeds the threshold, the UE may perform a reactive network slice switch. For example, the UE may attempt to switch to a new network slice, e.g., when there is another network slice ID that matches the running application main KPI values and can likely improve the main KPI values for the current serving cell conditions. In some instances, the UE may trigger the selection of the new network slice via a PDU session update procedure. The UE may (additionally) use a UAI procedure and/or any other procedure that allows the UE to coordinate a change only in RAN configuration with the network, e.g., without updating the entire PDU session. Note that in at least some instances, when there is no other network slice ID that matches the running application main KPI values and can likely improve the main KPI values for the current serving cell conditions, the UE may fall back to a default network slice, e.g., the UE may discontinue use of network slicing on the serving cell based on the current serving cell conditions.

Figure 8:
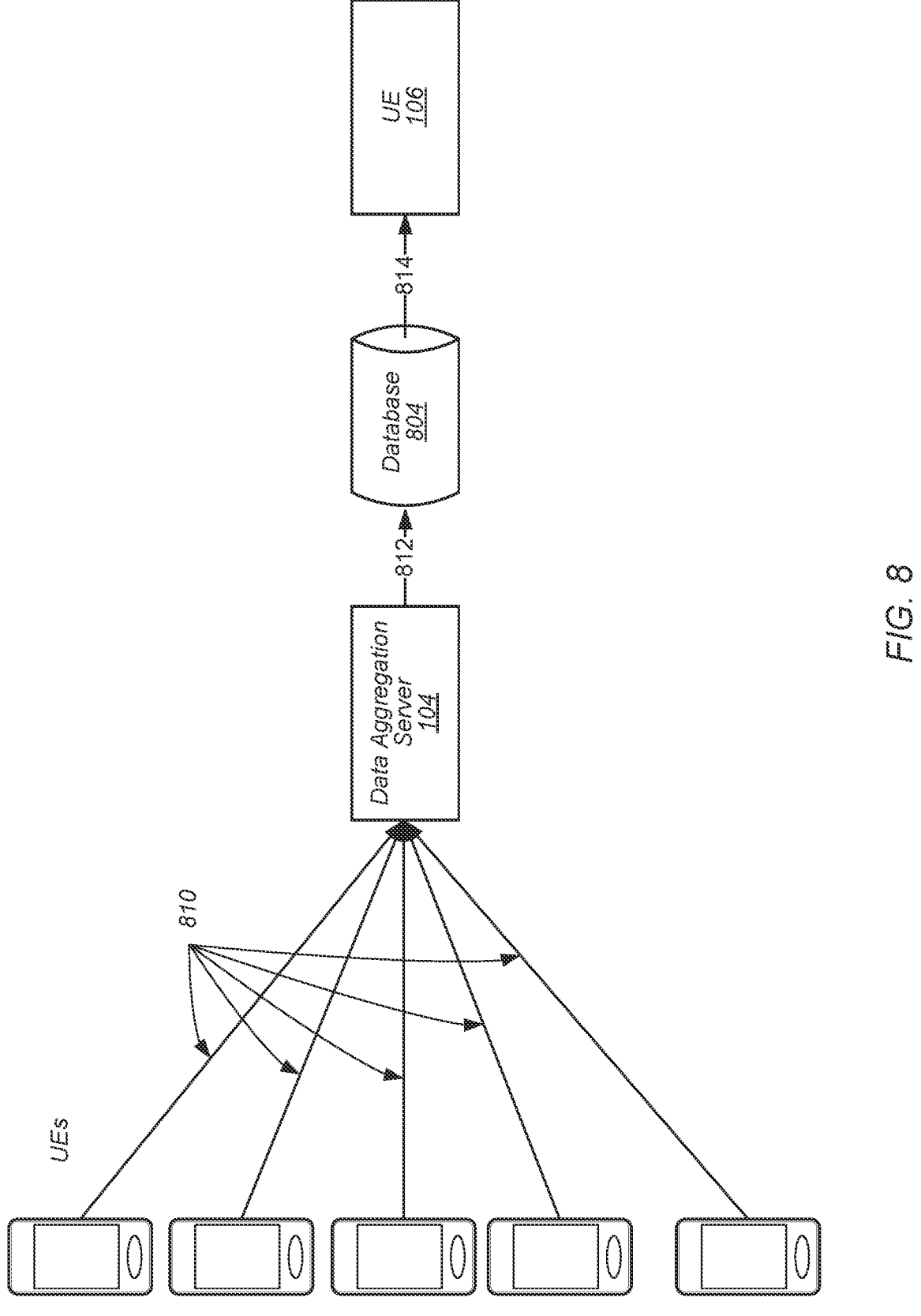
FIG. 8 illustrates an example of signaling for crowdsourcing and disseminating network slice configuration selection data, according to some embodiments.

FIG. 8 illustrates an example of signaling for crowdsourcing and disseminating network slice configuration selection data, according to some embodiments. The signaling shown in FIG. 8 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

A server, such as data aggregation server 104, may receive, from a plurality of UEs, each of which may be a UE 106, associated with the server, network slice configuration data at 812. For each UE of the plurality of UEs, the network slice configuration data may be aggregated per connection and collected from both application processors and baseband processors of each UE. The network slice configuration data may include, for each UE, a collection metrics for applications, network configurations, and/or KPIs. For example, for each UE, the network slice configuration data may include applications triggering and/or using a connection and corresponding selected network slice IDs, a network's configuration of the connection, including bandwidth, a number of carriers, a RAT, a control plane configuration, and so forth, radio conditions (e.g., such as RSRP and/or SINR), network congestion state and/or status, and/or KPIs for the connection, such as latency, throughput, setup delay, and so forth. Note that data collected from each UE does not include any identifying information associated with the UE and/or a user of the UE.

The server may then aggregate the network slice configuration. For example, the server may group KPIs by different network configurations and/or network slice IDs such that for each KPI a preferred/best network configuration is selected. Note that a "best" network configuration may be a network configuration that maximizes a selected KPI for a selected network slice per network radio conditions.

At 812, the server may send and/or transfer the aggregated network slice configuration data to a database, such as database 804. In some instances, the server may host the database 804. The database may be in the form of a lookup table that may be queried by a UE, such as UE 106, using a network slice ID per network radio conditions. In some instances, the server may push (e.g., automatically send and/or update) the database and/or a portion of the database to the UE. Thus, the UE may store the database and/or portion of the database in memory and access the database locally. In other instances, the UE may perform an over-the-air query of the database.

FIG. 9 illustrates a block diagram of an example of a method for network slice configuration requesting and/or selection, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a UE, such as UE 106, may select, based, at least in part, on crowdsourced data associated with network slice configurations and/or observed serving cell radio conditions, a network slice and a corresponding radio access network (RAN) configuration. In some instances, the UE may receive the crowdsourced data associated with network slice configurations from a server associated with the UE. In some instances, the crowdsourced data associated with the network slice may include one or more configurations associated with one or more of user equipment (UE) Route Selection Policy (URSP) rules (e.g., USRP configurations), a control plane (e.g., control plane configurations), a discontinuous reception cycle (DRX) preference (e.g., DRX configurations), scheduling (e.g., scheduling configurations), radio resource control (RRC) state preference (e.g., RRC configurations), and/or throughput (e.g., throughput configurations). In some instances, the one or more configurations may include information associated with one or more of serving cell reference signal received power (RSRP), serving cell signal to interference plus noise ratio (SINR), and/or network congestion. In some instances, the information may include categorizations (e.g., good, moderate, poor, and so forth) based on one or more ranges (e.g., one or more ranges of RSRP, SINR, and/or congestion).

In some instances, to select, based on the crowdsourced data and observed serving cell radio conditions, the network slice and the RAN configuration, the UE may indicate, in a protocol data unit (PDU), session setup request, a preference for the network slice. Further, the UE may perform a user equipment (UE) assistance (UAI) procedure to select the RAN configuration for the network slice and/or any other procedure that allows the UE to coordinate a change in RAN configuration with the network.

At 904, the UE may determine, based, at least in part, on the crowdsourced data, radio channel metrics that (will and/or can) indicate degradation of key performance indicators (KPIs) for the network slice.

At 906, the UE may monitor the radio channel metrics.

In some instances, to monitor the radio channel metrics, the UE may perform one or more of RSRP measurements on a serving cell, SINR measurements on the serving cell, monitoring of congestion on the serving cell, monitoring of a value of a main KPI for the network slice. Further, the UE may compare one or more of the radio channel metrics to a threshold. The threshold may include a hysteresis value.

In some instances, to monitor the radio channel metrics, the UE may determine whether the radio channel metrics indicated that a value main KPI of the network slice will degrade and in response to determining that the value of the main KPI of the network slice will degrade, trigger selection of the different RAN configuration for the network slice.

In some instances, to monitor the radio channel metrics, the UE may monitor, after switching to the different RAN configuration for the network slice, the value of the main KPI for the network slice and in response to determining that the value of the main KPI did not improve after switching to the different RAN configuration for the network slice, determine there is a different network slice that matches the main KPI and can improve the value of the main KPI given current serving cell conditions. Further, the UE may trigger selection of the different network slice.

In some instances, to monitor the radio channel metrics, the UE may monitor, after switching to the different RAN configuration for the network slice, the value of the main KPI for the network slice and in response to determining that the value of the main KPI did not improve after switching to the different RAN configuration for the network slice, determine there is not a different network slice that matches the main KPI and can improve the value of the main KPI given current serving cell conditions. Further, the UE may trigger selection of a default network slice.

In some instances, to monitor the radio channel metrics, the UE may determine whether the radio channel metrics indicated that a value main KPI of the network slice will degrade and in response to determining that the value of the main KPI of the network slice is not degrading, monitor a change in the value of the main KPI. Further, the UE may compare the change in the value of the main KPI to a KPI degradation threshold and in response to determining that the change in the value of the main KPI exceeds the KPI degradation threshold, determine there is a different network slice that matches the main KPI and can improve the value of the main KPI given current serving cell conditions. In addition, the UE may trigger selection of the different network slice.

In some instances, to monitor the radio channel metrics, the UE may determine whether the radio channel metrics indicated that a value main KPI of the network slice will degrade and in response to determining that the value of the main KPI of the network slice is not degrading, monitor a change in the value of the main KPI. Further, the UE may compare the change in the value of the main KPI to a KPI degradation threshold and in response to determining that the change in the value of the main KPI exceeds the KPI degradation threshold, determine there is not a different network slice that matches the main KPI and can improve the value of the main KPI given current serving cell conditions. In addition, the UE may trigger selection of a default network slice.

At 908, the UE may request (e.g., via negotiation and/or explicit command), based, at least in part, on the monitoring, to change to one of a different RAN configuration for the network slice or to change to a different network slice. In some instances, to request, based, at least in part, on the monitoring, to change to the different RAN configuration for the network slice or to change to the different network slice, the UE may perform a UAI procedure to change to the different RAN configuration for the network slice and/or any other procedure that allows the UE to coordinate a change in RAN configuration with the network, e.g., without updated the entire PDU session. In some instances, to request, based, at least in part, on the monitoring, to change to the different RAN configuration for the network slice or to change to the different network slice, the UE may perform a PDU update procedure to change to the different network slice and perform a UAI procedure to select the RAN configuration for the different network slice and/or any other procedure that allows the UE to coordinate a change in RAN configuration with the network.

In some instances, the UE may, e.g., prior to selecting the network slice and/or the RAN configuration, establish, with a serving cell, a radio resource control (RRC) connection. Thus, when the UE selected the network slice and/or the RAN configuration, the UE may be in an RRC connected state.

In some instances, the UE may collect network slice data and send, to a server, the network slice data. The crowd-sourced data associated with network slice configurations may be received from the server. In some instances, the network slice data may include one or more of applications triggering a connection to the network slice, a network slice identifier, network configuration information, radio conditions, network congestion state, and/or KPIs for the connection to the network slice.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for requesting a network slice configuration, comprising:

selecting, based on crowdsourced data associated with network slice configurations and observed serving cell radio conditions, a network slice and a radio access network (RAN) configuration;

determining, based, at least in part, on the crowdsourced data, radio channel metrics that indicate degradation of key performance indicators (KPIs) for the network slice;

monitoring the radio channel metrics; and requesting, based, at least in part, on the monitoring, to change to one of a different RAN configuration for the network slice or to change to a different network slice.

2. The method of claim 1, wherein requesting, based, at least in part, on the monitoring, to change to the different RAN configuration for the network slice or to change to the different network slice, comprises:

performing a user equipment (UE) assistance (UAI) procedure to change to the different RAN configuration for the network slice.

3. The method of claim 1, wherein requesting, based, at least in part, on the monitoring, to change to the different RAN configuration for the network slice or to change to the different network slice, comprises:

performing a protocol data unit (PDU) update procedure to change to the different network slice; and performing a user equipment (UE) assistance (UAI) procedure to select the RAN configuration for the different network slice.

4. The method of claim 1, wherein the crowdsourced data associated with the network slice comprises one or more configurations associated with one or more of:

user equipment (UE) Route Selection Policy (URSP) rules;

a control plane;

a discontinuous reception cycle preference;

scheduling;

radio resource control (RRC) state preference; or throughput.

5. The method of claim 4, wherein the one or more configurations include information associated with one or more of:

serving cell reference signal received power;

serving cell signal to interference plus noise ratio; or network congestion.

6. The method of claim 5, wherein the information includes categorizations based on one or more ranges.

7. The method of claim 1, wherein selecting, based on the crowdsourced data and observed serving cell radio conditions, the network slice and the RAN configuration comprises:

indicating, in a protocol data unit (PDU), session setup request, a preference for the network slice; and performing a user equipment (UE) assistance (UAI) procedure to select the RAN configuration for the network slice.

8. The method of claim 1, wherein monitoring the radio channel metrics comprises:

performing one or more of:

reference signal received power (RSRP) measurements on a serving cell;

signal to interference plus noise ratio (SINR) measurements on the serving cell;

monitoring congestion on the serving cell;

monitoring a value of a main KPI for the network slice; and comparing one or more of the radio channel metrics to a threshold.

9. The method of claim 8, wherein the threshold includes a hysteresis value.

10. A user equipment device (UE), comprising:

at least one antenna;

at least one radio in communication with the antenna; and at least one processor in communication with the at least one radio and configured to cause the UE to:

select, based on crowdsourced data associated with network slice configurations and observed serving cell radio conditions, a network slice and a corresponding radio access network (RAN) configuration;

monitor radio channel metrics that indicate degradation of key performance indicators (KPIs) for the network slice, wherein the KPIs are determined based, at least in part, on the crowdsourced data; and request, based, at least in part, on the monitoring, to change to one of a different RAN configuration for the network slice or to change to a different network slice.

11. The UE of claim 10, wherein, to monitor the radio channel metrics, the at least one processor is further configured to cause the UE to:

determine whether the radio channel metrics indicated that a value main KPI of the network slice will degrade; and in response to determining that the value of the main KPI of the network slice will degrade, trigger selection of the different RAN configuration for the network slice via the request.

12. The UE of claim 11, wherein, the at least one processor is further configured to cause the UE to:

monitor, after switching to the different RAN configuration for the network slice, the value of the main KPI for the network slice;

in response to determining that the value of the main KPI did not improve after switching to the different RAN configuration for the network slice, determine there is a different network slice that matches the main KPI and can improve the value of the main KPI given current serving cell conditions; and trigger selection of the different network slice.

13. The UE of claim 11, wherein, the at least one processor is further configured to cause the UE to:

monitor, after switching to the different RAN configuration for the network slice, the value of the main KPI for the network slice; and in response to determining that the value of the main KPI did not improve after switching to the different RAN configuration for the network slice, determine there is not a different network slice that matches the main KPI and can improve the value of the main KPI given current serving cell conditions; and trigger selection of a default network slice.

14. The UE of claim 10,
wherein, to monitor the radio channel metrics, the at least
one processor is further configured to cause the UE to:
determine whether the radio channel metrics indicated
that a value main KPI of the network slice will
degrade; and
in response to determining that the value of the main
KPI of the network slice is not degrading, monitor a
change in the value of the main KPI;
compare the change in the value of the main KPI to a
KPI degradation threshold; and
in response to determining that the change in the value
of the main KPI exceeds the KPI degradation thresh-
old, determine there is a different network slice that
matches the main KPI and can improve the value of
the main KPI given current serving cell conditions;
and
triggering selection of the different network slice.

15. The UE of claim 10,
wherein, to monitor the radio channel metrics, the at least
one processor is further configured to cause the UE to:
determine whether the radio channel metrics indicated
that a value main KPI of the network slice will
degrade; and
in response to determining that the value of the main
KPI of the network slice is not degrading, monitor a
change in the value of the main KPI;
compare the change in the value of the main KPI to a
KPI degradation threshold; and
in response to determining that the change in the value
of the main KPI exceeds the KPI degradation thresh-
old, determine there is not a different network slice
that matches the main KPI and can improve the value
of the main KPI given current serving cell condi-
tions; and
trigger selection of a default network slice.

16. An apparatus, comprising:
a memory; and
at least one processor in communication with the memory
and configured to:
select, based on crowdsourced data associated with
network slice configurations and observed serving
cell radio conditions, a network slice and a corre-
sponding radio access network (RAN) configuration;
monitor radio channel metrics that indicate degradation
of key performance indicators (KPIs) for the network
slice; and
request, based, at least in part, on the monitoring, to
change to one of a different RAN configuration for
the network slice or to change to a different network
slice.

17. The apparatus of claim 16,
wherein the at least one processor is further configured to:
establish, with a serving cell, a radio resource control
connection.

18. The apparatus of claim 16,
wherein the at least one processor is further configured to:
collect network slice data; and
send, to a server, the network slice data.

19. The apparatus of claim 18,
wherein the crowdsourced data associated with network
slice configurations is received from the server.

20. The apparatus of claim 18,
wherein the network slice data includes one or more of:
applications triggering a connection to the network
slice;
a network slice identifier;
network configuration information;
radio conditions;
network congestion state; or
KPIs for the connection to the network slice.

* * * * *